Feb. 26, 1957  S. M. HEISE ET AL  2,782,759
INCUBATOR EGG TURNING DEVICE
Filed Sept. 22, 1955  2 Sheets-Sheet 1
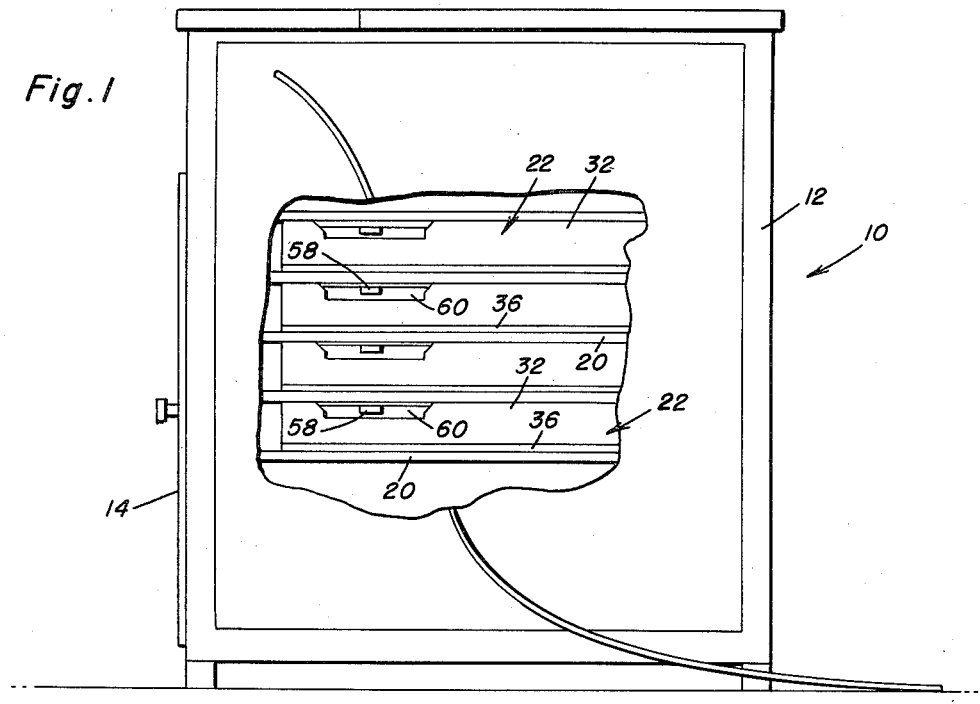
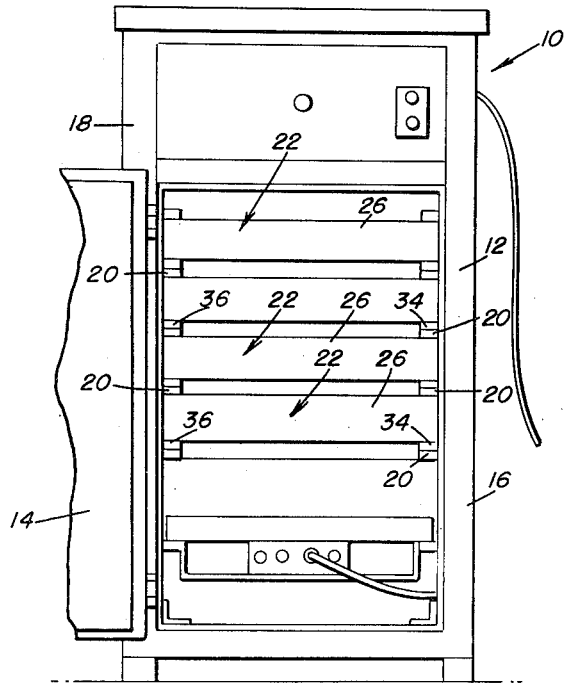
Samuel M. Heise
Grover C. Tipton
INVENTORS Feb. 26, 1957 S. M. HEISE ET AL 2,782,759
INCUBATOR EGG TURNING DEVICE
Filed Sept. 22, 1955 2 Sheets-Sheet 2
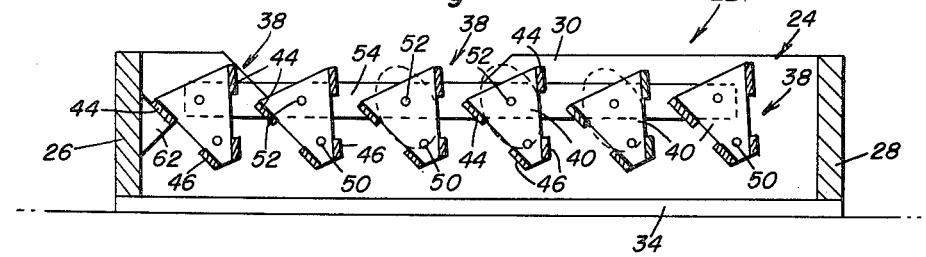
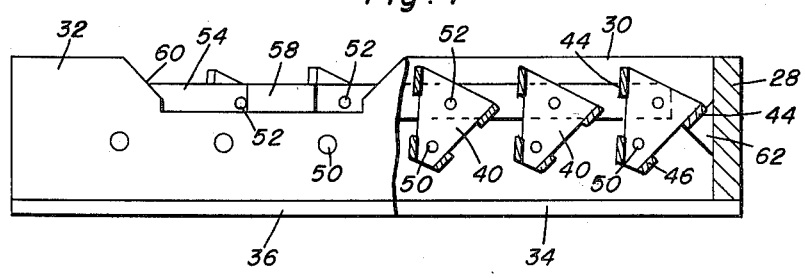
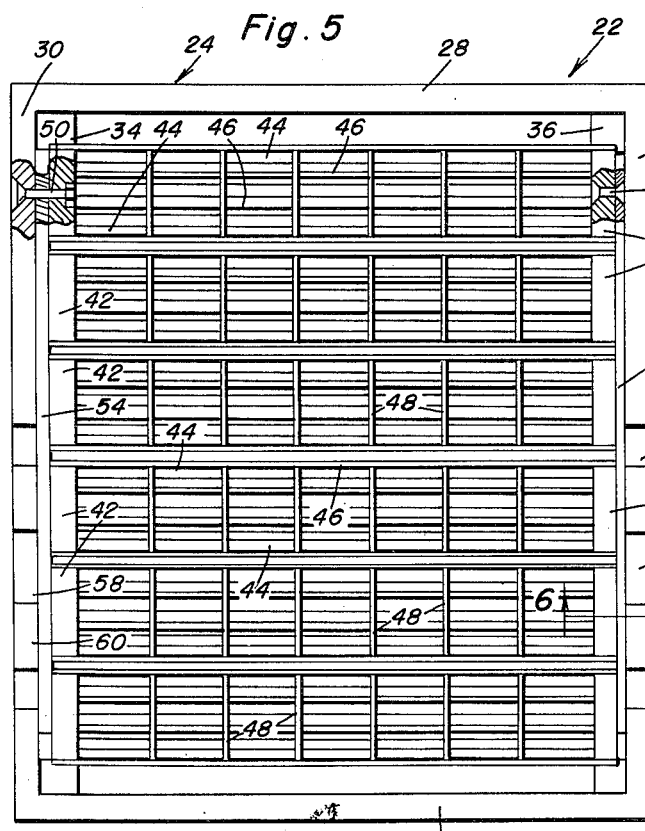
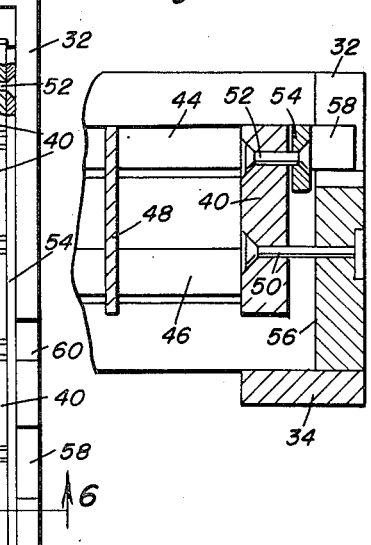
Samuel M. Heise
Grover C. Tipton
INVENTORS

United States Patent Office 2,782,759
Patented Feb. 26, 1957

2,782,759

INCUBATOR EGG TURNING DEVICE

Samuel M. Heise and Grover C. Tipton, Monette, Ark.

Application September 22, 1955, Serial No. 535,820

2 Claims. (Cl. 119—44)

This invention relates generally to incubating apparatus, and is more particularly concerned with a novel incubator tray for tilting eggs to be hatched therein between two inclined postions in order that the eggs may be hatched under simulated natural conditions.

The primary object of invention is to provide an incubator tray for tilting eggs between oppositely disposed angular positions wherein said tray is usable in incubators incorporating a plurality of horizontally disposed support runners, said tray being substantially rectangular and supporting between opposite side portions pivotal open framework egg supporting cradles, the pivotal path of which being within the confines defined by the upper and lower edge portions of the incubator tray.

A further object of invention in conformance with that set forth above is to provide a tiltable incubator tray wherein the horizontally pivotal cradles thereof are simultaneously tiltable about a horizontal pivot axis within the confines of a supporting frame, and in which the actuating means for the tiltable cradles is disposed in a relatively inaccessible position whereby the egg supporting cradles will not be accidentally tilted.

Another object of invention in conformance with that set forth above is to provide a tiltable incubator tray which is readily and economically manufactured, usable with a plurality of conventional incubators, and which is highly efficient and utilitarian for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a typical incubator, with portions broken away showing the disposition of the stack of the novel incubator trays therein;

Figure 2 is a front elevational view of the incubator of Figure 1 showing the disposition of the novel tray members;

Figure 3 is an enlarged longitudinal sectional view of the novel incubator tray, taken on a median line through Figure 5;

Figure 4 is a side elevational view of the novel incubator tray with portions broken away and in section showing the egg supporting cradles in the position opposite to that of Figure 3;

Figure 5 is a top plan view of the novel incubator tray with portions broken away for clarity; and Figure 6 is an enlarged sectional detail taken substantially on line 6—6 of Figure 5.

It is to be understood that the novel incubator trays may be utilized with incubators generally described as "still air" incubators or those incorporating an air circulating system. The purpose of tilting the eggs during incubation is in order to simulate natural hatching conditions wherein the hen hatching the eggs will normally rotate the same on the nest, this being for the purpose of ensuring that the embryo does not adhere to any portion of the egg while forming and to further ensure that the embryo will be properly formed. The eggs are normally placed with the smaller or pointed end down, wherein the larger portion of the egg, that which contains the air cell, is directed upwardly, that being the end toward which the chicken's beak will be directed. The eggs are turned or tilted approximately three times a day at eight hour intervals in order to ensure the proper forming of the embryo.

A conventional incubator is indicated generally at 10, including a suitable cabinet 12, access to the interior being controlled by a suitable access door 14, said incubator including therein suitably secured to inner surface portions of the vertically extending side walls 16 and 18 a plurality of vertically disposed parallel tray supporting elements 20. The support rails or runners 20 are those conventionally found in numerous commercial incubators, and will reciprocably support a plurality of stacked incubator trays indicated generally at 22, said trays incorporating the invention involved herein.

The incubator trays 22 incorporate an outer support frame 24 of a rectangular configuration and incorporating vertically disposed end wall members 26 and 28 suitably secured to side wall members 30 and 32. Longitudinally extending reinforcing strips 34 and 36 may be secured on the lower edge portions of the side wall members 30 and 32 extending between the end wall members 26 and 28. The strips 34 and 36 are reciprocably engageable on the runners 20, thus providing a space between the stacks of incubator trays providing for proper circulation of heated air about the eggs supported therein.

A plurality of tiltable horizontally rotatable open framework egg supporting cradles 38 are pivotally supported in longitudinally spaced relationship between oppositely disposed pivot portions on the side walls 32 and 34 of the frame 24. The cradles 38 comprise substantially triangular end portions 40 and 42 which have secured therebetween upper and lower strip elements 44 and 46 secured on opposite sides of the edges of the end plates 42 forming the open framework of the cradle and adding to the rigidity of said cradle. A plurality of vertically disposed substantially triangular partition elements 48 are suitably secured in substantially parallel relationship to the end portions 40 and 42 of the cradles providing separate egg compartments which open upwardly, whereby the previously mentioned smaller pointed end of an egg may be disposed toward the apex of the tiltable cradle.

The entire assembly may be constructed of wood, plastic or any other suitable material.

Each of the cradles 38 includes adjacent the apex portion of the portions 40 and 42 of said cradle a suitable aperture portion, see Figure 6, for receiving a pivot element 50 which is rotatably supported in a suitable aperture portion extending through oppositely disposed portions of the side walls 30 and 32. It will be noted that the pivot elements 50 are recessed in the outer wall portion of the side walls 30 and 32 in order to prevent any interference of the incubator tray with the inner surface side wall portions of the incubator in which they are stacked. As most clearly seen in Figures 3 and 4, the incubator cradles include no portions which will extend beyond the upper or lower edges of the support frame 24, thereby in no way interfering with the support runners of the incubator or other trays stacked thereabove, said trays permitting the incubator trays to actually be stacked one upon the other during certain installations and yet permitting the cradles to be pivoted in the alternate positions shown in Figures 3 and 4. Each of the end portions 40 and 42 of the cradles 38 include an upper pivot aperture portion pivotally receiving pivot pin element 52 which is vertically disposed relative to the previously mentioned pivot pin element 50, said pivot pin element 52 being connected to an elongated actuating or control lever element 54 which is interposed between the inner side wall surface 56 of the side walls 30 and 32, and adjacent the outer surface portions of the ends 40 and 42. Reciprocating movement of the control lever 54 results in tilting the cradles 38 to the positions illustrated in Figures 3 and 4 for the purpose heretofore mentioned. The lever or control elements 54 each include extending laterally therefrom an actuating portion 58 which is reciprocably received in a suitable longitudinally extending notched out portion 60 contained in each of the upper edges of the side walls 30 and 32.

The cradles as seen in Figures 3 and 4 may be rotated approximately through an arc of 90°, or through any other desirable arc depending upon that required for the particular eggs being hatched, and the strip portions 44 may engage the inner surface of the end walls 26 and 28, or the end walls 26 and 28 may be provided with suitable stop or abutment portions indicated at 62.

Thus, there has been disclosed a novel tilting incubator tray which is tiltable between two positions and including structure which permits the ready stacking and tilting of the egg supporting cradles horizontally pivoted in said tray. Additionally, it will be noted by virtue of the location of the pivot 50 adjacent the apex of the triangular cross-sectioned egg supporting cradle, that tilting of the cradles toward one direction or the other will result in a disposition of the weight of the eggs offcenter relative to the pivotal portion 50, thus more or less retaining the trays in their pivoted position.

In the event the trays are stacked immediately one upon the other, it is believed readily apparent that any suitable rod may be inserted in between the trays in order to tilt the same.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An incubating tray compriisng an open rectangular frame having upper and lower edges defined by oppositely disposed end and side wall members, a plurality of open framework horizontally pivotal egg cradles, said cradles being pivotally supported at lower pivot portions to oppositely disposed pivot portions on said side wall members, said cradles including an upper end portion pivotal in an arcuate path within the confines of the upper and lower edges of said frame below said upper edges, a reciprocable pivot lever element extending in parallel relationship between an inner surface portion of one of said side wall members and an adjacent end of said cradles below said upper edges, said pivot lever including a plurality of longitudinally disposed pivot portions pivotally connected to each of said cradles in vertically spaced relation to the pivot connection between the side walls of said frame and the lower portion of said cradles, the side wall member adjacent the pivot lever element including an elongated horizontally disposed notched out portion, and an actuating element extending laterally from said pivot lever in reciprocable overlying relationship in the notched out portion of said side wall member and being offset downwardly relative to said upper edges.

2. An incubator tray set forth in claim 1 wherein said end walls include an abutment portion below said upper edges on opposite inner surface portions for engagement with one of said egg cradles upon reciprocable movement of said pivot lever for defining a predetermined angular relationship of said cradle relative to a vertical axis.

References Cited in the file of this patent

UNITED STATES PATENTS

| | | |
|---|---|---|
| 1,083,469 | Templeton | Jan. 6, 1914 |
| 1,391,865 | Stevenson et al. | Sept. 27, 1921 |
| 1,574,401 | McKeon | Feb. 23, 1926 |
| 1,766,410 | Strain | June 24, 1930 |